Dec. 13, 1955   T. BERG ET AL   2,727,135
ILLUMINATED VIEWING DEVICE
Filed April 21, 1953   2 Sheets-Sheet 1
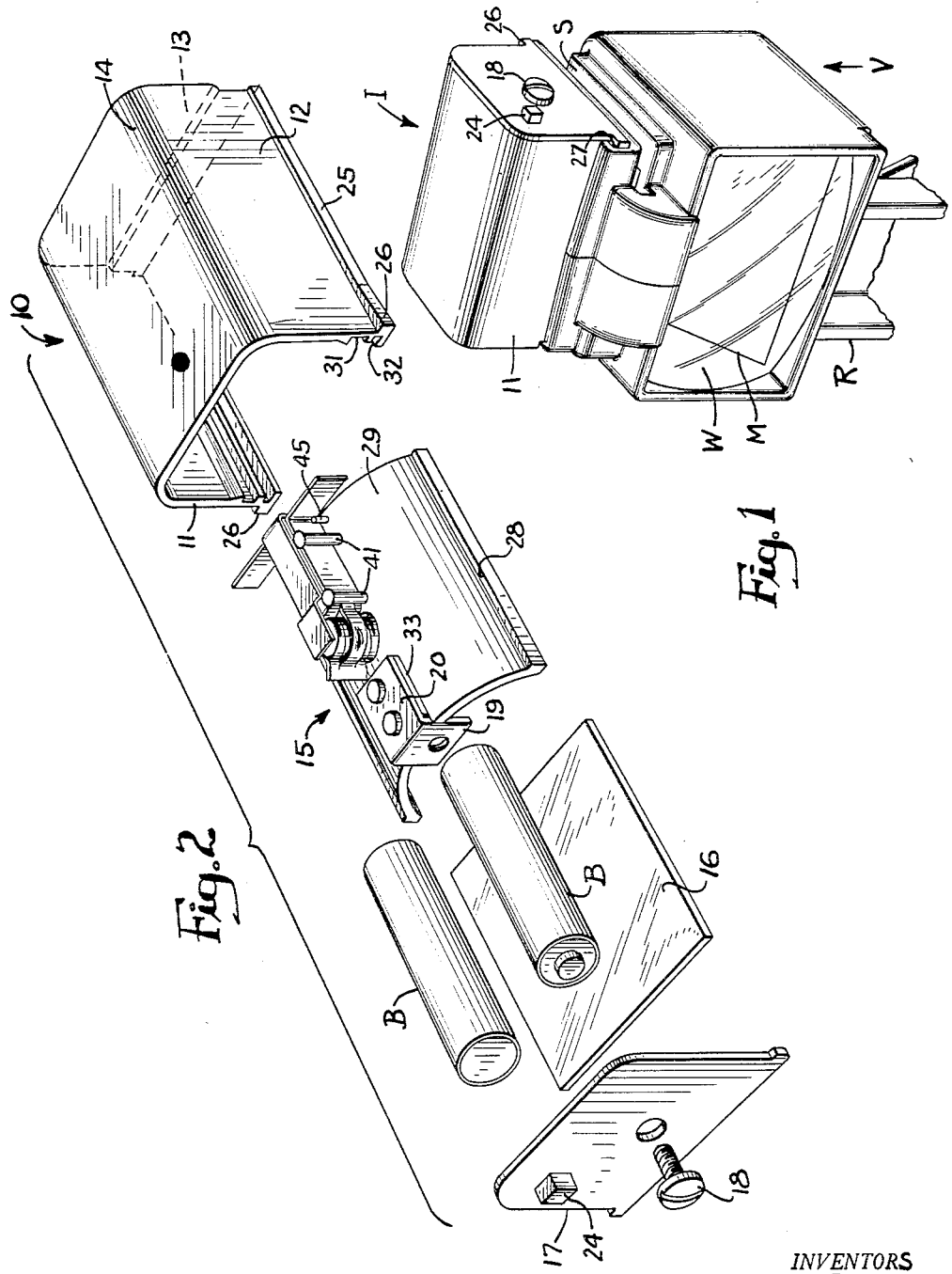
INVENTORS
THEODORE BERG
JOHN L. SZAJNA
BY
Kegan & Kipnis
attys.

Dec. 13, 1955   T. BERG ET AL   2,727,135
ILLUMINATED VIEWING DEVICE
Filed April 21, 1953   2 Sheets-Sheet 2
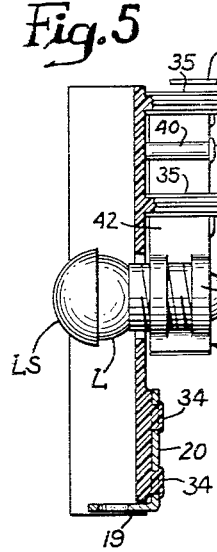
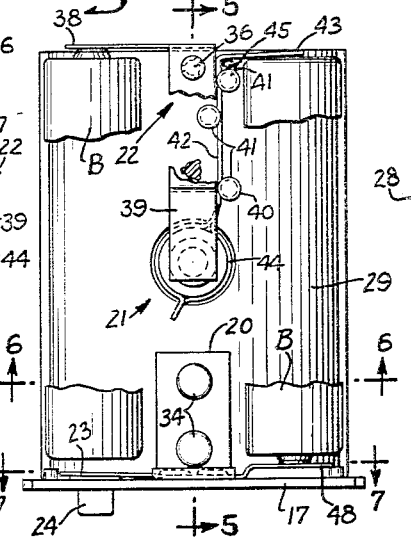
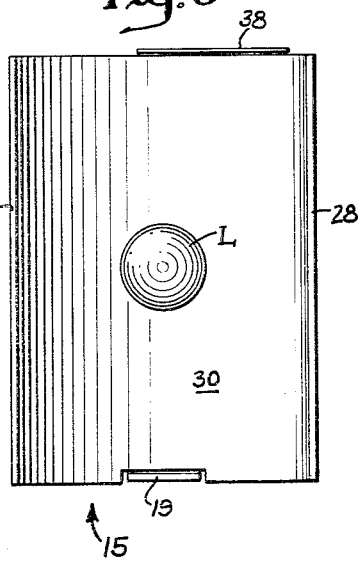
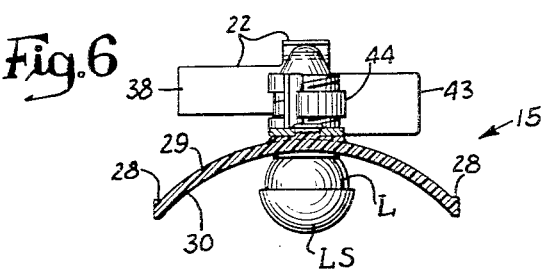
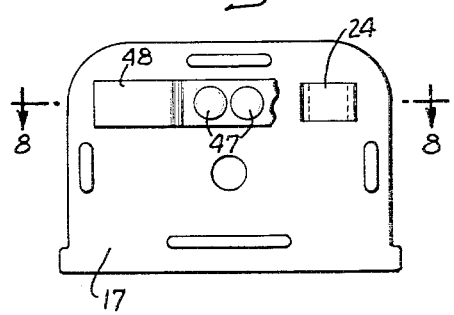
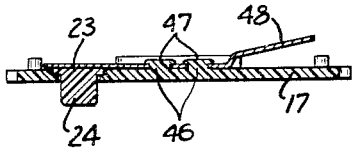
INVENTOR.
THEODORE BERG
JOHN L. SZAJNA
BY Kegan & Kegan
attys.

United States Patent Office 2,727,135
Patented Dec. 13, 1955

2,727,135

ILLUMINATED VIEWING DEVICE

Theodore Berg and John L. Szajna, Chicago, Ill., assignors to Michael S. Wolk, Chicago, Ill.

Application April 21, 1953, Serial No. 350,194

7 Claims. (Cl. 240—6.4)

This invention relates to an electrically illuminated viewing device for slides, films and the like. It relates particularly to a device of this kind which can readily be manipulated with one hand in order to facilitate use by a plurality of persons or at a variety of locations, in the inspection of snapshots, color diapositives and the like.

For an instrument of this kind it is inherently necessary that the illuminating unit should be compact; that the installation of said unit should not interfere with the required arrangement of the viewing aperture, the slide inserting aperture, and the provision, if any, for slide storage. The unit is improved particularly in this latter respect.

Viewers have recently been developed which provide an aperture and guide member for a slide to be viewed, at the top; an inspection window and housing therebelow, and a slide storage chamber with suitable apertures at the bottom. An illumination device for such a unit must allow installation at the very top, in which position it must be particularly compact in order not to make the entire viewer top-heavy and clumsy. The illumination unit must also have a bottom configuration conforming with the basic top design of the viewer which generally is rectangular to suit the standard form of slides and film segments to be viewed; and the illuminator must be capable to distribute light with fair uniformity over the rectangular area of the viewing field.

These various objectives have been achieved by the new construction and particularly by the novel housing, reflector, electric system and auxiliary parts of the device. The housing is basically box-shaped, with five substantially opaque walls and a translucent bottom wall of frosted glass or the like; said bottom wall being removably connected with the other walls by sliding fit in suitable grooves in order to facilitate insertion and removal either in case of breakage or in the event that different degrees of translucency or different colors of light are desired. One of the opaque end walls of the housing is also removable in order to facilitate insertion and removal of the reflector and electric parts. These electric parts consist mainly in a pair of small flashlight batteries which have sliding fit between the top of the reflector and the underside of the top wall of the housing; the desirable curvature of the reflector and the box-like shape of the housing being efficiently utilized in this manner and the bulk of the remaining electrical parts being suitably installed on top of the reflector between the two batteries and partly on the end walls of the housing, whereby an unexcelled degree of compactness is provided. By means of this arrangement and mainly by means of the provision of an "on and off" switch on one of the end walls of the housing the entire viewer unit is also simplified in practical use; all operations other than the insertion, forward and backward feeding and removal of slides or film or the like can be performed with the same hand which holds the unit.

The details of these various objects and features will be understood more thoroughly upon a perusal of the detailed description of a preferred embodiment, which follows. Of course it will be understood that the specific embodiment illustrated and described can be modified in various respects, within the scope of the claims appended at the end of this specification.

In the drawing:

Figure 1 is a perspective view of the top part of a viewer constructed in accordance herewith, showing particularly the new illuminator and the parts directly connected therewith.

Figure 2 is a perspective exploded view of the illuminator.

Figure 3 is a bottom view of the reflector.

Figure 4 is a top view of the reflector, with fragmentary representation of the batteries added thereto.

Figure 5 is a longitudinal section through the reflector the section being taken along the lines 5—5 in Figure 4.

Figure 6 is a transverse section through the reflector the section being taken along the lines 6—6 in Figure 4.

Figure 7 is a back view of the end plate carrying the on and off switch the view being taken in the direction of the arrows 7—7 in Figure 4.

Figure 8 is a section through the plate of Figure 7 and the section being taken along the lines 8—8 in Figure 7.

Figure 9 is a diagram of the electric system used in the viewer.

Referring first to Figure 1, the illumination unit I is installed as the uppermost part of the viewer V, directly above the viewing window W which faces forward. An inclined mirror M behind this window and below the illuminator transmits the light of the illuminator lamp L (see Figures 3 to 6) from its original downward direction to the forward facing window W. The top part of the viewer has a slot S for the admission and guidance of slides or film, directly below the bottom of the illuminator I. It will be noted that the user can hold the entire viewer in one hand, preferably in his left hand, his right hand then being free to remove slides from the receptacle part R below the window W, to insert them in the slot S, to remove them therefrom and to reinsert them in the receptacle R.

Referring now to Figure 2, the illuminator housing 10, preferably formed as a molded plastic unit, has elongated side walls 11 and 12 at the front and back of the viewer, respectively; a left hand end wall 13 and a top wall 14; these walls being integral with one another and defining a basically box-like unit the bottom and right hand end of which are open.

A reflector unit 15 is slidably inserted in said bottom, and directly below said reflector unit, a translucent, rectangular plate 16, preferably of white milk glass or similar plastic, is also slidably inserted in the bottom of the housing 10. It will be noted that the reflector 15, in order to transmit light downwardly through the translucent plate 16, is downwardly concave; more particularly it forms in substance a cylindrical segment or arc having the translucent plate 16 as a chord. A pair of small flashlight batteries B are installed, symmetrically, within the spaces formed between the end parts of the reflector arc and the underside of the top wall 14; these batteries being slightly shorter than the housing 10 (or conversely, the housing being slightly longer than the standard length of such batteries). The parts 15, 16 and B are held together and the housing 10 is completed by a right hand end wall 17 which closes the remaining open end of the housing.

A screw 18 extends through the approximate center of the right hand end plate 17 and is screwed into a vertical clip 19, secured to and depending from a horizontal bracket member 20 which is fastened to the top of the reflector 15 in the direct vicinity of the right hand end of the unit. The clip and bracket 19, 20 is formed of rigid metal and rigidly secured to said right hand end of the reflector so that, when the screw 18 is tightened the end plate 17 is firmly held to the right hand end of the reflector, preventing, by the suitable configuration of said end plate, any substantial movement of the translucent plate 16 or batteries B within the illuminator.

The insertion of the combined parts 15—17, together with the batteries B, into the housing 10 causes some little frictional pressure between such parts, so as to hold them together. For this purpose the spaces provided by housing 10, above the reflector, are slightly smaller than the full, circular, undistorted diameter of the batteries B.

Referring now to Figures 3 to 6 the lamp L has its bulb directly below the underside of the reflector 15, preferably with a suitable light shield LS on the underside of said bulb, which can be integral therewith and which may serve to reflect a major part of the light upward against the underside of the reflector and only then downward, to avoid over-illumination of the center part of the window W. In addition a light shield LS may also serve as a color filter or the like.

The shank of the lamp L extends through a hole in the approximate center of the reflector 15 and is threaded into a metallic socket member 21 at the top of said reflector, below the housing top wall 14. This socket 21 serves as one of the two conductors feeding electric current to the lamp. The second conductor 22 feeds current to the top end of the shank in the usual manner. These conductors are interconnected in the simple manner shown in Figure 9, with a resilient switch clip 23 secured to the right hand end wall 17. A push button 24 suitably inserted in this wall can bend this clip 23 into the housing, thereby establishing firm contact with one of the two batteries B. Release of the push button 24 allows the spring clip 23 to return to its normal position along the wall 17, breaking the firm contact with said battery B and de-energizing the lamp L.

It will thus be seen that the new unit basically provides a box-like housing slidably inserted in the very top of a viewer, directly above the slide or film to be viewed; the bottom of the box-like housing being formed by a translucent plate slidably inserted therein; an upwardly curved downwardly concave reflector in form of a cylindrical segment being slidably inserted in the housing directly above this plate, with an electric lamp in the center of the apex portion of the arc formed by the reflector, and with suitable conductors for the lamp above the same and batteries slidably inserted in the spaces between the edges of the reflector and the housing walls; these parts being held together with an end wall at the open end of the housing, by a simple device to clamp the end wall to the reflector and likewise to clamp the latter to the housing.

Furthermore the entire illuminator I is firmly clamped to the top part of the viewer V by means of outwardly extending flanges 25 at the bottom edges of the side walls 11 and 12, which flanges have wedge-shaped ends 26 adjacent the open, right hand end of the box-like housing. Straight grooves 27, substantially matching the flanges 25, are provided in the top portion of the viewer V, allowing easily sliding fit for the flanges 25 but causing some little inward distortion of the right hand ends of the walls 11, 12 and/or outward distortion of the grooved viewer members when the housing 10 has been fully inserted in the viewer. This inward distortion of the walls 11, 12 also serves to hold the parts 10, 15, 16 of the illuminator firmly together when the illuminator is in place upon the top of the viewer, while allowing relatively easy disassembly of the four basic illuminator parts 10, 15/17, 16 and B, for replacement of batteries B or lamps L, when the viewer and illuminator have been separated.

Accordingly the flanges 28 at the side edges of the reflector 15 are preferably straight and not provided with any wedge action so that the body 29 of the reflector is slightly distorted upward only by insertion of the housing in the viewer grooves 27 but not by insertion of the reflector in the housing itself. It will be understood that under no circumstances is the distortion of the reflector body 29 great enough to materially affect the optical characteristics of the reflecting underside 30 of the reflector 15. Likewise it will be understood that the grooves 31 for the flanges 28, and the grooves 32 for the translucent plate 16, at the bottom inside edges of the walls 11 and 12, can be formed in simple straight manner.

Inasmuch as the space provided for the electrical system is inherently limited, in the compact illuminator described, there is preferably used a space-conserving form of plastic riveting or attachment between the metallic conductors or attachment clips and the plastic parts described. For this purpose there is provided for instance a flat integral pad 33 on the top surface of the reflector 15 adjacent the right hand end of the unit, between the spaces for the batteries B, with upstanding plastic rivet members 34 thereon, fitting into and through suitably spaced holes in the bracket 20. These plastic rivet members 34 are given their flat headed form as shown, clamping the bracket 20 to the reflector 15, by brief application of a heated surface to the top ends of the rivet members, with some downward pressure.

The same form of attachment is also used for the installation of the metallic conductor strip 22. For this purpose a pair of posts 35 are integrally formed on the top of the reflector 15, adjacent the left hand end thereof, in line with the rivet members 34 and the hole for the lamp L. Suitably spaced holes in the conductor strip 22 fit over the reduced top ends 36 of these posts 35, which top ends are flat down on the strip 22 in the same manner as has been described for the elements 34. Thus a middle portion 37 of the conductor 22 is firmly held above and parallel with the reflector 15. A tong 38 at the left hand end of this portion 37 is bent downward and extends toward the front wall 11, to form a contact member for one end of the front battery B, while another end portion 39 of the member 37 is suitably kept in contact with the top end of the lamp socket, in well known manner.

The other contact strip 21 as shown is clamped between three posts 40 upstanding from the top of the reflector 15 and is held below the conductor 22 and out of contact therewith by the expedient of making the posts 40 shorter than the posts 35. Top flanges 41 are provided on the posts 40 by the same thermo-electric treatment as has been described for the rivets 34 and 36, thereby holding the vertically installed middle portion 42 of the conductor 21 below the conductor portion 37. Adjacent the left hand end of the unit the vertical strip 42 is bent toward the side wall 13 at the back of the unit, for contact with the second battery B, forming an extension 43. The other end of the conductor 21 or strip 42 forms the lamp engaging socket 44, which can be formed by punching out an elongated portion of the strip, bending the punched out portion into a substantially semi-circular shape and bending the remaining and adjacent portions of the strip in the opposite direction to form a circular socket. When making the punched out portion approximately as wide as the pitch of the screw threads on the lamp shank adequate engagement can be obtained between those threads and the socket 44. A post 45 between the conductor portions 42 and 43 may be provided to accurately position the conductor and the lamp L held thereby.

The described plastic riveting method can also be used with advantage in order to hold the contact forming strip 23 to the end wall 17. For this purpose plastic rivet members 46 are integrally formed in this wall, extending into the housing 10, and inserted in suitably spaced holes in the strip 23, their ends being flattened to form rivet heads 47 and thereby to securely hold the middle portion of the strip 23 to the wall 17. One end of this strip, as mentioned, is resiliently displaceable by the push button 24, to make or break firm contact with the front battery B the other end of which is then engaged by the strip 38. The other end of the strip 23, shown at 48, is so bent as to permanently maintain resilient contact with the adjacent end of the second battery B, the other end of which contacts the conductor end 43.

It will be noted by persons skilled in the art that a number of modifications can be applied.

What is claimed is:

1. In a viewer for slides and the like, a viewer housing, a pair of straight parallel spaced mutually facing slots in the top part of the viewer housing; a box-like illuminator housing including a top wall, side walls and an end wall, external flanges on the bottom edges of the side walls slidable in said slots, each of said side walls having two straight parallel grooves adjacent the bottom edge of and on the inside face of each of said side walls, a translucent plate slidably inserted into the lowermost pair of the last mentioned grooves; a reflector slidably inserted in the uppermost pair of the last mentioned grooves, said reflector being formed substantially as a cylindrical arc having the translucent plate as a chord; an illuminator lamp mounted substantially centrally of the apex portion of said arc; a pair of flashlight batteries inserted between the top of the reflector and the underside of the top of the illuminator housing; an end plate for the illuminator housing, secured to the free end of the reflector; and means to selectively close and open an electric circuit comprising the batteries and the illuminator lamp.

2. Apparatus according to claim 1, additionally comprising a pair of wedge-shaped projections, one on each outer flange of the illuminator housing adjacent one end thereof.

3. Apparatus according to claim 1, additionally comprising a rigid bracket secured to the free end of the reflector, a clip secured to and depending from the rigid bracket, and a screw extending through the end plate of the illuminator housing and threaded into the clip.

4. Apparatus according to claim 3 wherein the bracket is secured to the reflector by means of at least two plastic rivets integral with the reflector, upstanding from the top thereof, extending through corresponding holes in the bracket and flattened down over the bracket.

5. Apparatus according to claim 1 wherein the conductors forming part of the electric circuit for the illuminator lamp are metallic strips interposed between flat surfaces on the top of the reflector and plastic rivets formed integral therewith and flattened down over the metallic strips.

6. Apparatus according to claim 1 wherein a push button is provided in one of the exposed walls of the illuminator housing said push button co-operating with a resilient element in the circuit system of the reflector lamp.

7. Apparatus as described in claim 6 wherein the circuit system of the reflector lamp comprises a metallic strip secured to the end wall of the illuminator housing adjacent the center portion of said wall; said strip having one resilient end portion cooperating with one terminal of one of the batteries and with the push button to form a switch and a second resilient portion cooperating with the other battery to maintain permanent contact with one terminal of said other battery.

References Cited in the file of this patent

UNITED STATES PATENTS

| | | |
|---|---|---|
| 1,015,730 | Gill | Jan. 23, 1912 |
| 2,349,013 | Sparling | May 16, 1944 |
| 2,495,047 | Afton et al. | Jan. 17, 1950 |
| 2,604,814 | Smith | July 29, 1952 |
| 2,666,359 | Collins | Jan. 19, 1954 |

FOREIGN PATENTS

| | | |
|---|---|---|
| 418,491 | Great Britain | Apr. 3, 1934 |